Figure 1:
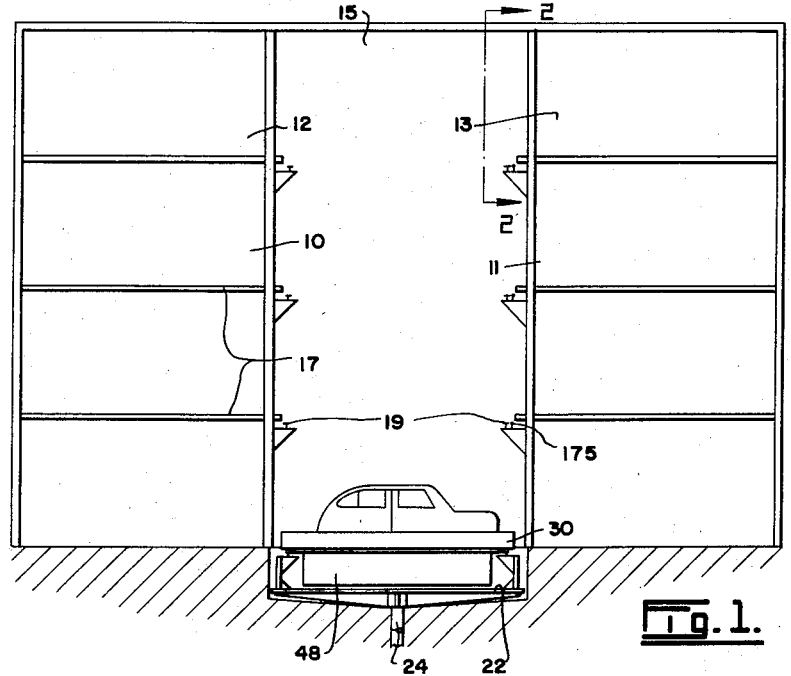

Feb. 17, 1959 G. KAVANAGH 2,873,864
AUTOMOBILE PARKING APPARATUS
Filed April 6, 1956 5 Sheets-Sheet 1

INVENTOR
GERALD KAVANAGH
BY
Featherstonhaugh & Co.
ATTORNEYS

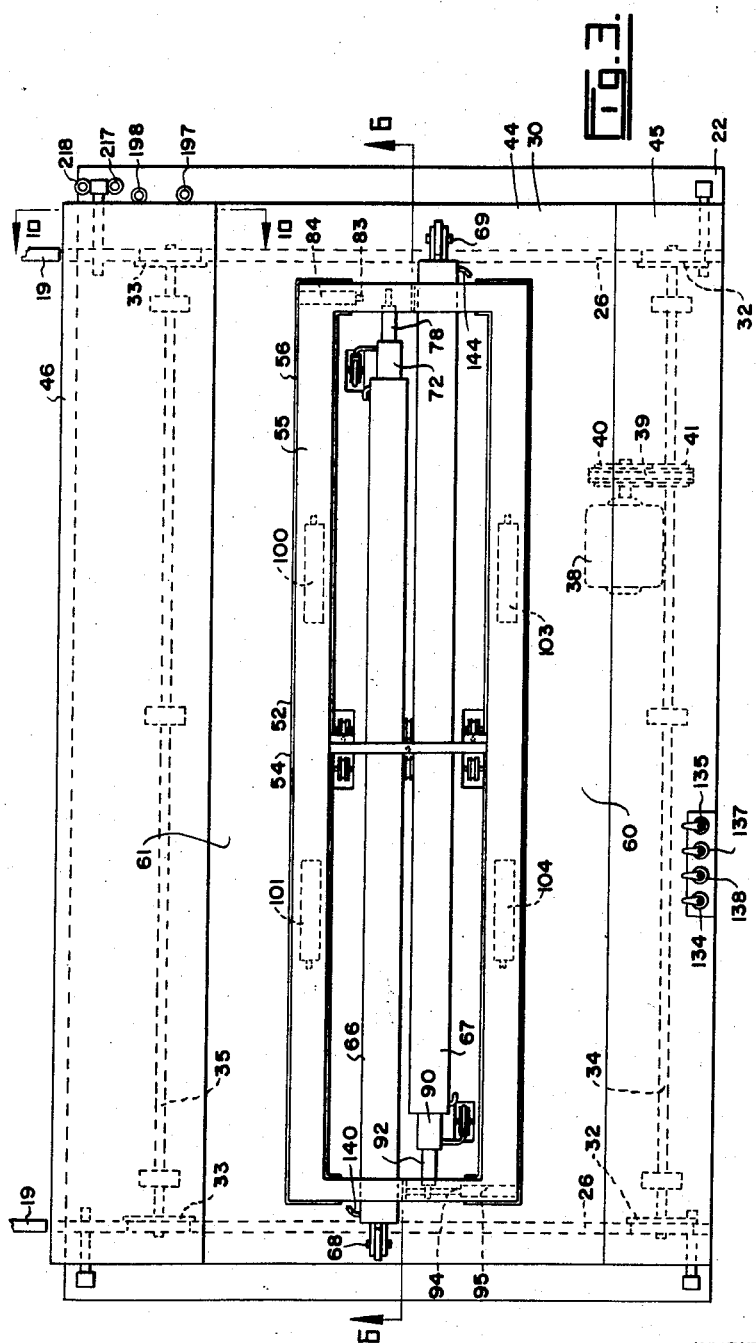

Feb. 17, 1959  G. KAVANAGH  2,873,864
AUTOMOBILE PARKING APPARATUS
Filed April 6, 1956  5 Sheets-Sheet 3
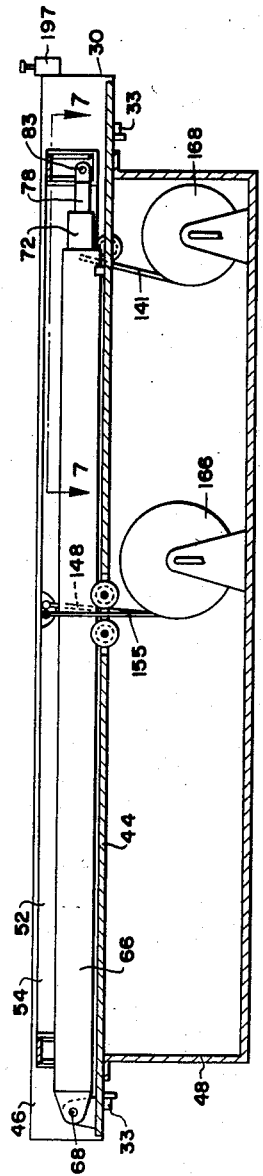
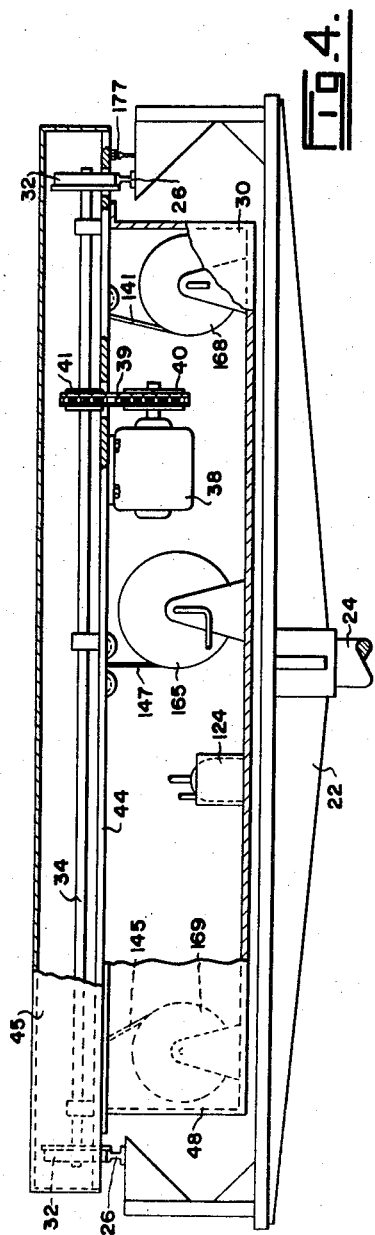
INVENTOR
GERALD KAVANAGH
BY
*Fetherstonhaugh & Co.*
ATTORNEYS Feb. 17, 1959 G. KAVANAGH 2,873,864
AUTOMOBILE PARKING APPARATUS
Filed April 6, 1956 5 Sheets-Sheet 4
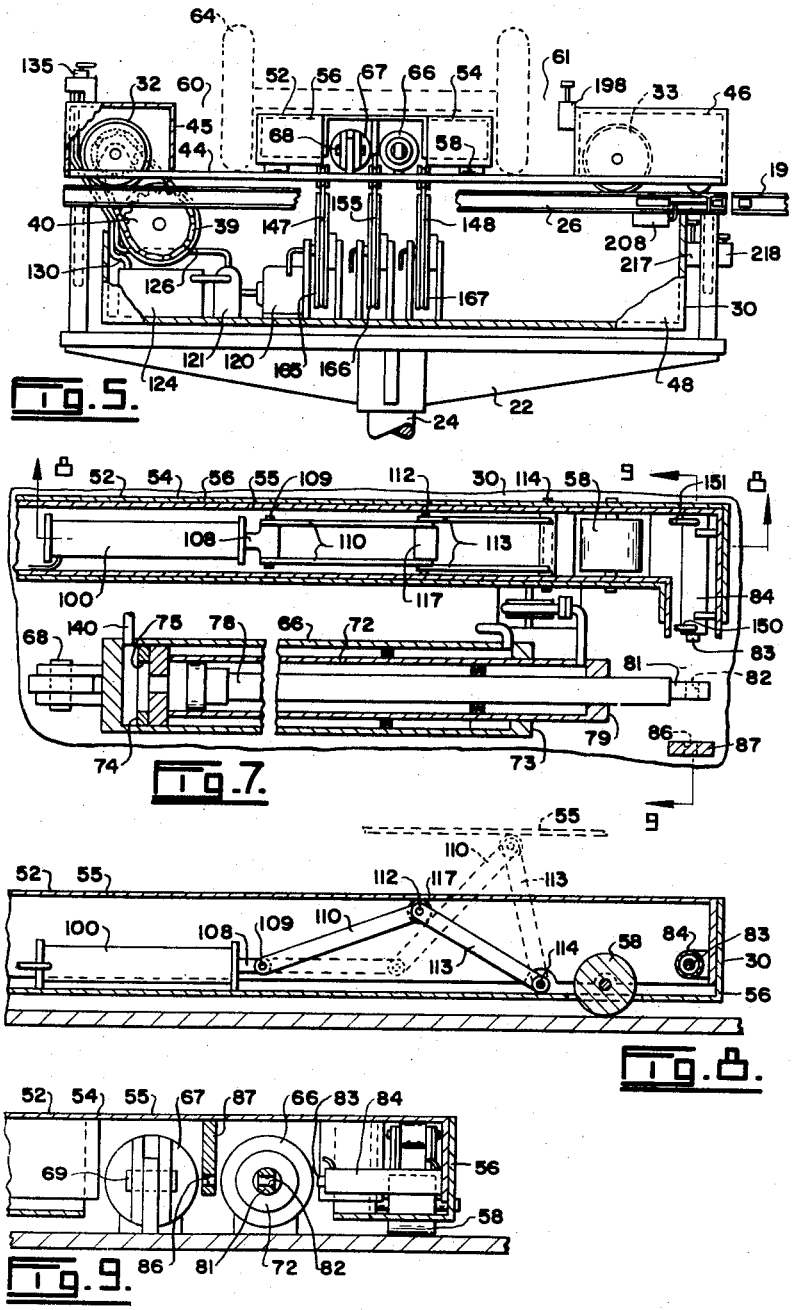
INVENTOR
GERALD KAVANAGH
BY
Fetherstonhaugh & Co.
ATTORNEYS Feb. 17, 1959 G. KAVANAGH 2,873,864
AUTOMOBILE PARKING APPARATUS
Filed April 6, 1956 5 Sheets-Sheet 5
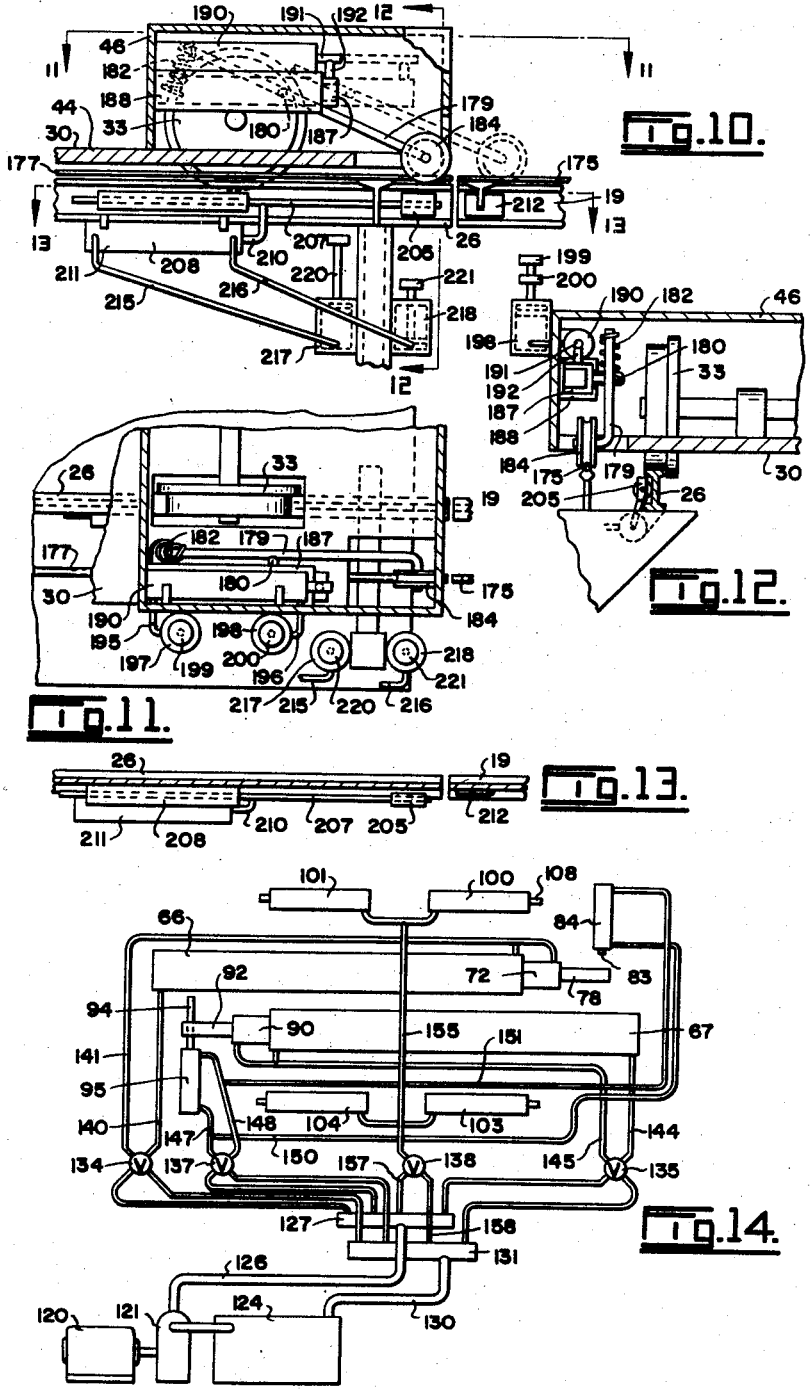
INVENTOR
GERALD KAVANAGH
BY
Fetherstonhaugh & Co.
ATTORNEYS nited States Patent Office 2,873,864
Patented Feb. 17, 1959

2,873,864

AUTOMOBILE PARKING APPARATUS

Gerald Kavanagh, Portland, Oreg.

Application April 6, 1956, Serial No. 576,715

3 Claims. (Cl. 214—16.1)

This invention relates to improvements in apparatus for parking automobiles and other vehicles.

It is well known that today the parking of vehicles in congested cities is a very great problem. As the main problem relates to automobiles, this invention will be described in connection therewith. Efforts have been made to overcome this problem by providing banks of storage compartments on opposite sides of an aisle. Travelling elevators have been provided in these aisles for lifting vehicles to desired levels and shifting them along the aisle into line with selected storage compartments.

The present invention applies to this type of vehicle storage apparatus, but it eliminates the necessity of a travelling elevator. It includes an elevator at one end of an aisle which is used to raise the vehicle to the different levels of the storage compartment.

Apparatus according to this invention includes a carriage movably mounted on the elevator. The elevator preferably includes tracks upon which the carriage is mounted, and said elevator moves its tracks into line with tracks at the different storage compartment levels. The carriage is self-contained and includes its own driving mechanism for moving it along the elevator and aisle tracks. The operator who rides with the carriage can stop it in line with compartments on opposite sides of the aisle. He can then select in which compartment he is going to store a car carried by the carriage. The carriage includes means for lifting the car up off the carriage, and shifting it into a compartment on either side of the carriage. When the car is in the compartment, it is deposited on the floor thereof, and the conveying mechanism is retracted to the carriage. The operator then moves the carriage back on to the elevator, and directs the latter to the loading level or zone.

When it is desired to remove a vehicle from the storage apparatus, the elevator is taken to the level at which the vehicle is stored, and then the carriage is moved into line with the particular compartment holding that vehicle. The shifting mechanism is then directed outwardly from the carriage under the vehicle and operated to lift the latter off its wheels. Then the shifting mechanism is retracted to the carriage, and said carriage is moved back on to the elevator and taken to the loading and unloading level.

Figure 2:
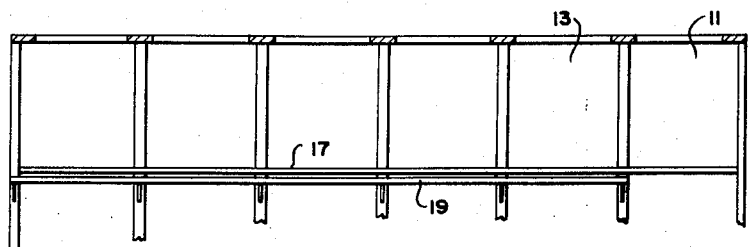

An example of this invention is illustrated in the accompanying drawings, in which, Figure 1 is a diagrammatic end elevation of two banks of storage compartments on opposite sides of an aisle, with the elevator at the bottom or loading level, Figure 2 is a fragmentary vertical section taken on the line 2—2 of Figure 1, Figure 3 is an enlarged plan view of the carriage for carrying vehicles on and off the elevator, Figure 4 is an end elevation of the carriage of Figure 3, partly in section, Figure 5 is a side elevation of the carriage, partly in section, Figure 6 is a section taken on the line 6—6 of Figure 3, Figure 7 is an enlarged fragmentary horizontal section taken substantially on the line 7—7 of Figure 6, Figure 8 is a vertical section taken on the line 8—8 of Figure 7, Figure 9 is a vertical section taken on the line 9—9 of Figure 7, Figure 10 is an enlarged fragmentary sectional view taken on the line 10—10 of Figure 3, Figure 11 is a horizontal section taken on the line 11—11 of Figure 10, Figure 12 is a vertical section taken on the line 12—12 of Figure 10, Figure 13 is a horizontal section taken on the line 13—13 of Figure 10, and Figure 14 is a diagrammatic view of the hydraulic system for operating the various components of the carriage.

Referring to Figures 1 and 2 of the drawings, two banks 10 and 11 of storage compartments 12 and 13, respectively, are mounted on opposite sides of a central aisle 15 extending therebetween. The compartments 12 and 13 are arranged opposite each other at a plurality of levels 17. A pair of tracks 19 for each level 17 extend longitudinally through the apparatus and along the aisle 15. The tracks for each level are located near the floors of the compartments of that level.

An elevator 22 is located at one end of aisle 15 and is raised and lowered by suitable mechanism, generally designated by the numeral 24, to the different floor levels of the storage compartments. As the mechanism for raising and lowering the elevator and controlling the latter are well known in the art, these have not been described herein. It is sufficient to say that the operator can cause the elevator to move to any one of the desired floor levels.

The elevator has a pair of tracks 26 extending across it in line with aisle 15, and when the elevator is stopped at any one of the floor levels, these tracks are aligned with the tracks 19 of that particular level.

A carriage 30 normally rests on the elevator 22, said carriage having pairs of wheels 32 and 33 fixedly mounted respectively on axles 34 and 35. These wheels ride on tracks 26, and one or both pairs is or are rotated in any desired manner to move the carriage. In this example, an electric motor 38 is connected by chain 39 and sprockets 40 and 41 to shaft 34. Operation of this motor turns the shaft and its wheels 32 to move the carriage.

The carriage consists of a base 44 having covers 45 and 46 extending along its opposite ends over the wheels and axles of the carriage. A large container 48 is secured to the bottom of base 44 and depends therefrom between the carriage wheels, as clearly shown in Figures 4 to 6.

When the elevator 22 reaches a desired level, motor 38 is set into operation to move it off tracks 26 on to aisle tracks 19 of that level. The controls for stopping and starting the motor have not been shown, but they would include stop and starting buttons as is well known in the art.

A dolly 52 is mounted on the base 44 of the carriage 30 for movement laterally of the latter. This dolly is made up of a rectangular frame 54 which is preferably formed of telescoping upper and lower sections 55 and 56, see Figures 7 to 9. The frame of the dolly is provided with a plurality of rollers 58 which permit the dolly to be moved laterally of the carriage. Suitable means is provided for raising and lowering the upper sections 55 relative to the lower section 56 of the dolly. The sides of the dolly are spaced from the covers 45 and 46 to provide passages 60 and 61 extending across the carriage and through which the wheels of the vehicle may move.

When carriage 30 is at the loading and unloading level, it is loaded by driving a vehicle on to it with its wheels moving through passages 60 and 61. This means that the wheels of the vehicle straddle dolly 52. Vehicle wheels are shown at 64 in broken lines in Figure 5. As soon as the vehicle is on the carriage, or when it is desired to shift a vehicle into storage compartment 12 or 13, the upper section of the dolly is raised to lift the vehicle off its wheels, and then the dolly is shifted laterally into the selected compartment.

The dolly is preferably shifted by hydraulic means, although pneumatic means may be used, if desired. For this purpose, piston arrangements are provided, said arrangement including comparatively long cylinders 66 and 67 extending transversely of the carriage beneath the dolly. These cylinders are respectively pivotally mounted at their inner ends at 68 and 69 adjacent opposite sides of the carriage.

Cylinder 66 has an intermediate cylinder 72 slidably mounted therein and extending the length thereof and beyond its outer end 73, see Figure 7. A piston 74 is fixedly connected to cylinder 72 at its inner end, said piston having a hole 75 therethrough by means of which the interior of the intermediate cylinder communicates with the interior of the outer piston 66. An inner piston 78 is slidably mounted in the intermediate piston or cylinder and projects beyond the outer end 79 of the latter. The outer end of piston 78 is adapted to be removably connected to the adjacent end of the dolly 52 in any desired manner. For this purpose, the outer end of said piston is provided with a lug 81 having an eye or hole 82 therethrough, said hole being aligned with a ram 83 of a hydraulic cylinder 84 carried by the dolly at one side of an end thereof. Cylinder 84 may be operated to advance and retract ram 83, and when the latter is advanced, it moves through hole 82 of piston 78, and into a hole 86 of a lug 87 projecting upwardly from part of the frame of the dolly.

When inner piston 78 is connected to the dolly through ram 83, and when oil or hydraulic fluid is pumped into the outer cylinder 66, cylinder 72 and the inner piston are moved outwardly together until piston 74 engages the outer end 73 of the outer cylinder. At this time, the intermediate cylinder stops, but the inner piston continues to move until its inner end engages the outer end 79 of the intermediate cylinder. During this time, the dolly 52 is moved laterally off carriage 30 and into one of the storage compartments of the apparatus. Therefore, the operator can selectively connect the dolly to the hydraulic arrangement of cylinder 66 in order to move said dolly in one direction off the carriage.

Cylinder 67 has an intermediate cylinder 90 and an inner piston 92 arranged in the same manner as the corresponding elements of cylinder 66. The outer end of piston 92 may be selectively connected to the dolly by means of a ram 94 of a hydraulic cylinder 95, see Figure 3. This cylinder and ram is similar to cylinder 84 and ram 83. Therefore, by operating the proper controls, the operator may connect the inner piston 92 to the dolly in order to shift the latter off the carriage in the opposite direction to that previously described.

As previously stated, the upper section 55 of the dolly may be raised and lowered relative to the lower section 56 thereof. This is accomplished by pairs of hydraulic cylinders 100—101 and 103—104 under opposite sides of the dolly frame, see Figure 3. As all these cylinders and the mechanisms associated therewith are the same, one only, namely cylinder 100, will now be described in detail. Cylinder 100, see Figures 7 to 9, is mounted within the lower section 56 of the dolly frame and lies in a substantially horizontal plane. This cylinder has a piston rod 108 slidably projecting from one end thereof, said rod being connected by a pivot 109 to a link 110 which, in turn, is connected by a pivot 112 to another link 113, the opposite end of which is connected by a pivot 114 to the bottom of frame section 56. A roller 117 is carried by pivot 112. When piston 108 is retracted in its cylinder 100, links 110 and 113 are in the form of an inverted shallow V with roller 117 engaging the undersurface of the top of the upper dolly section 55, at which time said section is in its lowermost or retracted position. When rod 108 moves outwardly from its cylinder, the outer end of link 110 is moved towards the outer end of link 113, forcing roller 117 upwardly. This action moves the upper frame section 55 upwardly. As this action takes place simultaneously at cylinders 100, 101, 103 and 104, the upper frame section is raised while it is maintained in a horizontal position. Therefore, anything resting on said section is raised in the same manner.

As previously stated, when a vehicle is on carriage 30, its wheels 64 span dolly 52. When the upper section of this dolly is raised, it engages portions of the under part of the vehicle to lift it off its wheels. Therefore, when the dolly is shifted laterally off the carriage, the vehicle is moved with it. Once a vehicle is in a storage compartment, the upper section of the dolly is lowered to deposit the vehicle on its own wheels, after which the dolly may be returned to the carriage.

Figure 14 is a diagrammatic illustration of the hydraulic set up for the carriage and its dolly. An electric motor 120 operates a fluid pump 121 which draws its fluid from a reservoir 124. A pipe 126 connects the pressure side of the pump to a pressure header 127, while another pipe 130 connects the reservoir to a return header 131. Control valves 134, 135, 137 and 138 are provided on carriage 30. Valve 134 controls cylinder 66 and its intermediate and inner pistons; valve 135 controls cylinder 67 and its intermediate and inner pistons; valve 137 controls cylinders 95 and 84; and valve 138 controls cylinders 100, 101, 103 and 104.

Valve 134 may be operated to direct pressure fluid through pipe 140 to the inner end of cylinder 66, while fluid from the outer end of said cylinder and from the outer end of its intermediate cylinder 72 is directed by pipe 141 back to the return header 131 and the reservoir 124. Valve 134 may be reversed to cause pressure fluid to flow through pipe 141, and return fluid through pipe 140. Similarly, valve 135 may be operated to direct pressure fluid through pipe 144 to the inner end of cylinder 67, while return fluid is directed from the outer ends of said cylinder and the outer end of its intermediate cylinder 90 back through pipe 145 to the return header 131 and reservoir 124. Valve 135 also may be operated to direct pressure fluid through pipe 145 and return fluid through pipe 144.

Valve 137 may be operated to direct pressure fluid through either of pipes 147 or 148 to either end of cylinder 95. When one of these pipes is connected to the pressure header 127, the other pipe is connected to return header 131. Pipes 150 and 151 connect pipes 147 and 148 to opposite ends of cylinder 84. Therefore, valve 137 selectively directs pressure fluid to either end of cylinder 84 and return fluid from its opposite ends.

Valve 138 is a little different from the others. It is connected by a pipe system 155 to the inner ends of each of the cylinders 100, 101, 103 and 104. Valve 138 is adapted selectively to connect either pipe 157 or 158 to the pipe system 155. Pipe 157 extends to the valve from the pressure header 127, while pipe 158 extends to said valve from the return header 131. When valve 138 is in one position, the pressure fluid moves through system 155 to move the piston rods of the four cylinders connected thereto outwardly. When the valve is moved to the other position, fluid flows from these cylinders through pipe 158 to return header. At this time, the weight of the upper section 55 of the dolly 52 with or without a load is sufficient to force the piston rods of these cylinders back into their cylinders.

As all the hydraulic cylinders described so far are mounted on dolly 52 which may be shifted laterally off the carriage 30, most of the pipes are flexible. In order to prevent these pipes from getting tangled up, a number of drums have been provided upon which the pipes are wound. Each drum is spring-loaded, and is so designed that fluid is directed into the hub thereof and through a rotatable connection to the pipe in question. As drums of this type are very well known, it is not necessary to describe them in detail herein.

By referring to Figures 4 to 6, it will be seen that drums 165, 166, 167, 168 and 169 have been provided for pipes 147, 155, 148, 141 and 145, respectively. These drums unwind as the dolly moves outwardly from the carriage, and wind up the pipes or lines when the dolly moves in the opposite direction.

It is possible to use a pneumatic system in place of the hydraulic system described above. In this case, air used to move the piston in one direction would be exhausted to atmosphere when the piston is moved in the opposite direction.

Although small gasoline motors may be used for moving the carriage and for operating the hydraulic system thereof, it is preferable to use electric motors, as described above and shown in the drawings. This makes it necessary to provide means for supplying electrical power to the carriage 30. For this purpose, a trolley wire 175 extends alongside the rail 19 of each level of bank 11. This wire is connected to a suitable source of power, not shown. Carriage 30 is provided with a trolley wire 177 alongside one of its rails 26 so that when the latter is aligned with one of the rails 19, said wire 177 is aligned with one of the trolley wires 175.

Carriage 30 is provided with a trolley pole 179 pivotally mounted at 180 near a side of the carriage, the opposite end of said pole being normally urged upwardly by a spring 182. The opposite end of the pole is provided with a pulley 184 which rides on wire 177 when the carriage is on elevator 20, and on wire 175 when the carriage is on tracks 19. Spring 182 maintains pulley 184 firmly against the trolley wires.

When the elevator arrives at a selected floor level, it is necessary to move the trolley pole and its pulley outwardly from the carriage to trolley wire 175. This may be accomplished by mounting the pivot 180 on the side of a slide 187 movably mounted within a support 188 which, in turn, is supported by cover 46. A cylinder 190 is positioned above support 188 and parallel therewith, see Figures 10 to 12, said cylinder having a piston rod 191 which is connected by a link 192 to the slide 187. Pipes 195 and 196 extend from opposite ends of this cylinder respectively to operating cylinders 197 and 198. These cylinders have plungers 199 and 200 projecting upwardly therefrom, one of said plungers being up when the other is down, plunger 200 being shown in its lower position in the drawings.

When plunger 200 is down, piston rod 191 is retracted in its cylinder 190, but when plunger 199 is pressed down, the rod moves outwardly while plunger 200 moves upwardly. There is a fluid between these plungers and a piston, not shown, in cylinder 190 which is connected to the rod 191. When rod 191 is moved outwardly, the trolley pole 179 and its pulley 180 move outwardly of the carriage, as shown in dotted lines in Figure 10. At this time the pulley rides on trolley wire 175 so that the electrical power is made available for the motors on the carriage. These motors are connected to the trolley pole in any convenient manner, not shown.

When the elevator 22 reaches a selected floor level, the operator depresses plunger 199 to move the trolley pole and its wheel out into engagement with the trolley wire 175. When he desires to leave that level, he depresses plunger 200 to retract the pole and pulley.

It may be desired to make a connection between one of the rails 26 of the carriage and the rail 19 in line therewith when the elevator is at a floor level. This may be done by means of a slidably-mounted block 205, said block being clearly shown in Figures 10 and 13. This block is mounted on the end of a rod 207 slidably mounted in an elongated bearing 208 mounted on the side of one of the tracks 26. The rod may be moved back and forth by a piston rod 210 projecting from a cylinder 211 mounted beneath the bearing 208. When piston rod 210 is retracted, block 205 lies alongside rail 26, and when said piston rod is moved out of its cylinder the block overlaps rail 19 and engages another block 212 mounted on the latter.

Pipes 215 and 216 extend from opposite ends of cylinder 211 to operate cylinders 217 and 218, respectively. Cylinder 217 has an operating plunger 220 projecting upwardly therefrom, while cylinder 218 has an outwardly-extending plunger 221. There is a fluid between these plungers and a piston, not shown, in cylinder 211 which is connected to the piston rod 210. When plunger 220 is up, plunger 221 is down, and vice versa. With this arrangement, when plunger 221 is down, block 205 is retracted outside rail 26, and when plunger 220 is depressed, said block is moved outwardly to engage block 212 of rail 19.

The general operation of this apparatus is apparent from the above description. When the elevator 22 is at the loading level, a vehicle may be driven on to carriage 30 over dolly 52, after which the brakes of the vehicle are set. The elevator is then raised to the desired floor level. The operator depresses plunger 199 to move the trolley pole 184 out into engagement with trolley wire 175. Then motor 38 is operated to move the carriage on to the tracks 19. When the carriage is opposite the desired storage compartment 12 or 13, the carriage is stopped. Control valve 138 is operated if this has not previously been done, to raise the upper frame section of the dolly to lift the vehicle off its wheels. Then the operator turns control valve 137 to connect either pipes 147—150 or pipes 148—151 to the pressure header 127. If, for example, he connects pipes 147—150 to the pressure header, ram 94 is moved out of its cylinder 95 while ram 83 is retracted into its cylinder 84. This connects the inner piston 92 of cylinder 67 to the dolly and disconnects inner piston 78 of cylinder 66 therefrom. It will be noted that rams 83 and 94 are so long that there is always at least one connected to the hydraulic apparatus. He now turns control valve 195 to force pistons 90 and 92 out of cylinder 67, thereby moving the dolly and vehicle off the carriage into one of the compartments 12. When the dolly has reached the end of its travel, valve 138 is reversed to allow the upper frame section of the dolly to move downwardly to deposit the vehicle with its brakes set in the compartment. Then valve 135 may be reversed to retract pistons 90 and 92 into their cylinder in order to return the dolly to the carriage. Motor 38 is again operated to return the carriage to the elevator, and plunger 200 is depressed to retract the trolley pole and its pulley.

If it is desired to remove a vehicle from a storage compartment, the carriage is moved into line with that compartment, the dolly is moved out beneath the vehicle, and its upper frame section is raised to lift the vehicle off the floor. The dolly is then returned to the carriage, and the latter moved back on to the elevator. At any desired time, the upper frame section of the dolly is lowered to deposit the vehicle on to the carriage. When the elevator reaches the unloading zone, the vehicle may be moved or driven off it.

While the vehicle may be driven on to the elevator, it may be left in line therewith, after which the vehicle may be picked up by the dolly and shifted on to the carriage.

What I claim as my invention is:

1. In vehicle parking apparatus, two banks of storage compartments mounted on opposite sides of a central aisle, said compartments being arranged opposite each other at a plurality of levels and having aligned floors, tracks for each level extending along the aisle adjacent the compartment floors, a trolley wire extending along the aisle parallel to the tracks at each level, an elevator mounted for vertical movement in line with the aisle and movable to the different levels, tracks on the elevator and aligned with the aisle tracks when the elevator stops at each level, a carriage normally on the elevator and having wheels to ride on the elevator and aisle tracks, said carriage having a floor aligned with the compartment floors when said carriage is on the aisle tracks, a trolley mounted on the carriage and movable outwardly and inwardly with respect thereto, said trolley being completely within the elevator when in its inner position and being aligned with the trolley wire of each level when the elevator stops at said level, means on the carriage for moving the trolley outwardly of the elevator into engagement with a trolley wire and back away from the latter, an electric motor on the carriage electrically connected to the trolley, driving means connecting the motor to the carriage wheels to move said carriage along the elevator and aisle tracks, a dolly movable on the carriage, operating means on the carriage for moving the dolly laterally of the latter into compartments on either side thereof, and means for selecting the direction of movement of the dolly off the carriage.

2. Vehicle parking apparatus as claimed in claim 1 in which the means for moving the dolly laterally of the carriage comprises hydraulic cylinders extending transversely of the carriage in opposite directions, each cylinder having an end connected to the carriage near a side thereof and a piston projecting from its opposite end, means on the carriage for selectively connecting the pistons to the opposite ends of the dolly, a pump arrangement for directing fluid to the cylinders to move the pistons in and out thereof, and an electric motor electrically connected to the trolley for operating the pump means.

3. Vehicle parking apparatus as claimed in claim 1 in which the means for moving the trolley comprises a slide movably mounted on the carriage and extending in the direction of movement of the trolley, said trolley being pivotally mounted on the slide, a cylinder mounted on the carriage near and extending parallel to the slide, a piston rod operatively projecting from the cylinder, means connecting the piston rod to the slide, operating cylinders connected to opposite ends of the first cylinder, and plungers projecting from the operating cylinders, said plungers being opposed so that when one is retracted, the other is extended, whereby the retraction of one plunger causes the other plunger and the trolley to be moved outwardly and retraction of said other plunger moves the opposed plunger outwardly and the trolley inwardly of the carriage.

References Cited in the file of this patent

UNITED STATES PATENTS

| | | |
|---|---|---|
| 871,457 | Thayer | Nov. 19, 1907 |
| 1,931,402 | Black | Oct. 17, 1933 |
| 2,285,232 | Sheehan | June 2, 1942 |
| 2,598,750 | Bargehr | June 3, 1952 |
| 2,626,065 | Sanders et al. | Jan. 20, 1953 |
| 2,675,134 | Becker | Apr. 13, 1954 |
| 2,815,136 | Mayer | Dec. 3, 1957 |